United States Patent
Gemulla et al.

(10) Patent No.: US 8,140,466 B2
(45) Date of Patent: Mar. 20, 2012

(54) SYSTEM AND METHOD FOR MAINTAINING AND UTILIZING BERNOULLI SAMPLES OVER EVOLVING MULTISETS

(75) Inventors: Rainer Gemulla, Dresden (DE); Peter Jay Haas, San Jose, CA (US); Wolfgang Lehner, Dresden (DE)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 12/101,985

(22) Filed: Apr. 24, 2008

(65) Prior Publication Data

US 2009/0271421 A1   Oct. 29, 2009

(51) Int. Cl.
*G06F 15/00* (2006.01)
*G06F 15/18* (2006.01)

(52) U.S. Cl. ............ 706/62; 706/45; 707/609; 707/803; 707/953; 707/999.101

(58) Field of Classification Search .................. None
See application file for complete search history.

(56) References Cited

U.S. PATENT DOCUMENTS

| | | | |
|---|---|---|---|
| 6,532,458 B1 | 3/2003 | Chaudhuri et al. | |
| 6,842,753 B2 | 1/2005 | Chaudhuri et al. | |
| 6,993,516 B2 * | 1/2006 | Haas et al. | 1/1 |
| 7,006,954 B1 | 2/2006 | Curtis et al. | |
| 7,191,181 B2 | 3/2007 | Chaudhuri et al. | |
| 7,536,403 B2 * | 5/2009 | Gemulla et al. | 1/1 |
| 7,827,211 B2 * | 11/2010 | Gemulla et al. | 707/803 |
| 2004/0083084 A1 | 4/2004 | West | |
| 2004/0128290 A1 | 7/2004 | Haas et al. | |
| 2008/0059540 A1 * | 3/2008 | Brown et al. | 707/204 |
| 2008/0154541 A1 * | 6/2008 | Gemulla et al. | 702/181 |

OTHER PUBLICATIONS

Gemulla et al. "Deferred Maintenance of Disk-Based Random Samples", Springer-Verlag Berlin Heidelberg, 2006, pp. 423-441.*
Gupta et al. "On Sequential Ranking and Selection Procedures", Department of Statistics Purdue University, 1988, pp. 1-26.*
Beyer et al. "On Synopses for Distinct-Value Estimation Under Multiset Operation", SIGMOD, 2007, pp. 199-210.*
Haas et al. "A Bi-Level Scheme for Database Samplimg", SIGMOD, 2004, pp. 275-286.*
Gemulla et al. "A Dip in the Reservoir: Maintaining Sample Synopses of Evolving Datasets" VLDB, 2006, 12 pages.*
Gemulla, R., et al., "Maintaining Bernoulli Samples over Evolving Multisets," ACM PODS '07 Jun. 11-13, 2007 Beijing, China, pp. 93-102.
Haas, P. J., "Towards a Synopsis Warehouse", http://www.almaden.ibm.com/cs/people/peterh/berkeley_09_07.ppt.
Gibbons, P., B., et al., "New Sampling-Based Summary Statistics for Improving Approximate Query Answers", ACM SIGMOD '98 Seattle WA, pp. 331-342.

* cited by examiner

*Primary Examiner* — Omar Fernandez Rivas
(74) *Attorney, Agent, or Firm* — Jeffrey T. Holman (57) ABSTRACT

One embodiment of the present invention provides a method for incrementally maintaining a Bernoulli sample S with sampling rate q over a multiset R in the presence of update, delete, and insert transactions. The method includes processing items inserted into R using Bernoulli sampling and augmenting S with tracking counters during this processing. Items deleted from R are processed by using the tracking counters and by removing newly deleted items from S using a calculated probability while maintaining a degree of uniformity in S.

20 Claims, 6 Drawing Sheets

*FIG. 1*

1: *q*: the sampling rate
2: *S*: the augmented Bernoulli sample
3:
4: INSERT(*t*):
5: if *S* contains *t* then
6:    (X,Y) ← S[*t*]
7:    if RAND() < q then    // t ∈ S, insertion accepted
8:       X ← X+1
9:    end if
10:    Y ← Y+1
11:    S[*t*] ← (X,Y)
12: else if RAND() < *q* then   // t ∉ S, insertion accepted
13:    S[*t*] ← (1,1)               // add t to the sample
14: end if
15:
16: DELETE(*t*):
17: if *S* contains *t* then
18:    (X,Y) ← S[*t*]
19:    if Y = 1 then         // last seen occurrence of t
20:       remove *t* from *S*
21:    else                    // more than one occurrence
22:       if RAND() < (X−1)/(Y−1) then // deletion accepted
23:          X ← X−1
24:       end if
25:       Y ← Y−1
26:       S[*t*] = (X,Y)
27:    end if
28: end if

*FIG. 2*

1: $q$: current sampling rate
2: $q'$: desired sampling rate, $q' \leq q$
3: $S$: the augmented Bernoulli sample
4: $q^* \leftarrow q'/q$
5: for all $t \in S$ do
6:    $(X,Y) \leftarrow S[t]$
7:    $X \leftarrow \text{COMPUTE}\Psi(X, q^*)$
8:    if $\text{RAND}() < q^*$ then       // first item included
9:       $X \leftarrow X+1$
10:       $S[t] = (X, Y)$
11:    else if $X = 0$ then       // all items excluded
12:       remove $t$ from $S$
13:    else       // first item excluded
14:       $Y \leftarrow \text{COMPUTE}\Upsilon(X,Y)$
15:       $S[t] = (X, Y)$
16:    end if
17: end for
18:
19: $\text{COMPUTE}\Psi(X, q^*)$       // simple version
20: $\Psi \leftarrow 0$
21: for $1 \leq i \leq X-1$ do
22:    if $\text{RAND}() < q^*$ then
23:       $\Psi \leftarrow \Psi+1$
24:    end if
25: end for
26: return $\Psi$
27:
28: $\text{COMPUTE}\Upsilon(X, Y)$       // simple version
29: $\Upsilon \leftarrow Y-1$
30: while $\text{RAND}() < X/\Upsilon$ do
31:    $\Upsilon \leftarrow \Upsilon-1$
32: end while
33: return $\Upsilon$

SYSTEM AND METHOD FOR MAINTAINING AND UTILIZING BERNOULLI SAMPLES OVER EVOLVING MULTISETS

FIELD OF INVENTION

The present invention generally relates to systems and methods for sampling database systems, and particularly to systems and methods for maintaining Bernoulli samples over evolving multisets.

BACKGROUND

In modern data management systems it is important to be able to generate random samples of data. Functions such as approximate query answering, query optimization, summarization of data streams, network monitoring, and data mining all rely on random sampling. Prior approaches to sampling from databases typically view the database as static, focusing on the problem of producing and exploiting a one-time sample in an efficient manner. However, even the best algorithms for materializing a sample in response to a user request can be expensive. One alternative approach is to materialize a sample and incrementally maintain it as the underlying dataset evolves so that a sample is always available when needed.

When maintaining a sample it is important to avoid accesses to the underlying dataset, and touch only the sample itself, while processing a stream of update, delete, and insert (UDI) transactions to the dataset. The reason for this is that database accesses are typically much more expensive than accesses to the sample. One reason for this is that database accesses usually require I/O operations on disks, whereas samples are often stored in main memory. In distributed systems, the underlying dataset may reside at a remote location. Algorithms requiring access to the underlying dataset may not be competitive in terms of cost. Furthermore, in many streaming data systems, the underlying dataset may not be accessible at all.

Uniform random sampling, in which all samples of the same size are equally likely, is the most important database sampling scheme. Uniform samples are ubiquitous in applications: most statistical estimators, and the confidence-bound formulas for these estimators, assume an underlying uniform sample. Thus uniformity is a must if it is not known in advance how the sample will be used. Uniform sampling is also a building block for more complex sampling schemes, such as stratified sampling. Methods for producing and maintaining uniform samples are therefore key to modern information systems.

Almost all of the known techniques for maintaining uniform samples apply either to the insert-only case or to datasets that do not contain duplicates, i.e., datasets that are true sets. However, datasets that commonly appear in relational databases and other systems often are multisets, which are sets that do contain duplicates. Some prior work has been done on "counting samples", a technique which can handle arbitrary UDI transactions on multisets, and which uses subsampling techniques to ensure that the sample footprint stays within a specified upper bound. The counting sample is also used to estimate answers to "hot list" queries, i.e., to estimate frequencies (in the dataset) of highly frequent items. There are several disadvantages to counting samples. First, it has been shown that the use of subsampling actually causes the samples to be non-uniform. More importantly, even if the non-uniformity problem for counting samples is "corrected" by avoiding subsampling, the actual uniform sample desired by the user is produced from the (corrected) counting sample by a "coin-flipping" step, which causes an undesirable delay in providing the sample to the user, and which can also cause statistical instability because the uniform sample is randomly generated every time the sample is accessed. Finally, the frequency estimates proposed for counting samples have been shown to be biased; that is, on average, the estimators will systematically overestimate or underestimate the true item frequencies. This unbiasedness problem persists even when subsampling is avoided, as discussed above.

One form of uniform random sampling is Bernoulli sampling. In Bernoulli sampling, each element is included into the sample with a fixed probability q, and excluded with probability 1−q, independently of the other elements. In the context of database sampling, Bernoulli random samples are a popular and convenient form of random sampling; Bernoulli samples are easy to work with, and are well suited for parallel processing. Specifically, Bernoulli samples can be maintained, independently and in parallel, for disjoint datasets, and the samples can be merged at any time to obtain a Bernoulli sample of the union of datasets. Bernoulli samples can also be easily subsampled, in order to reduce their space requirements. However, maintaining a Bernoulli sample of a multiset is harder than maintaining a Bernoulli sample of an ordinary set.

In general, previous techniques for maintaining uniform samples either require access to the underlying dataset, do not handle deletions, do not produce Bernoulli samples, only sample from datasets that are true sets and not from multisets, or require an undesirable coin-flipping step.

Accordingly, there is a need for systems and methods for maintaining uniform samples in the presence of arbitrary updates, delete, and insert operations without requiring access to the underlying dataset. There is also a need for systems and methods for maintaining Bernoulli samples of multisets without requiring access to the underlying dataset.

SUMMARY OF THE INVENTION

To overcome the limitations in the prior art briefly described above, the present invention provides a method, computer program product, and system for maintaining Bernoulli samples over evolving multisets.

In one embodiment of the present invention, a method for incrementally maintaining a Bernoulli sample S with sampling rate q over a multiset R in the presence of update, delete, and insert transactions comprises: processing items inserted into R using Bernoulli sampling; augmenting S with tracking counters during this processing; and processing items deleted from R by using the tracking counters, the step of processing items deleted including removing newly deleted items from S according to a calculated probability while maintaining a degree of uniformity in S.

In another embodiment of the present invention, a method for sampling a multiset R comprises: generating a Bernoulli sample S of the multiset R; creating tracking counters for keeping track of insertions and deletions of items in R; and using the tracking counters to obtain estimators of at least one of: the frequency of an item in R; the number of distinct items in R; aggregates of numerical functions defined on the items in R; and functions of the aggregates.

In an additional embodiment of the present invention a system for incrementally maintaining a Bernoulli sample S with sampling rate q over a multiset R in the presence of update, delete, and insert transactions comprises: means for processing items inserted into R using Bernoulli sampling; means for augmenting S with tracking counters during the processing; and means for processing items deleted from R by using the tracking counters, the means for processing items deleted including means for removing newly deleted items from S according to a calculated probability while maintaining a degree of uniformity in S.

In a further embodiment of the present invention, a computer program product comprising a computer usable medium having a computer readable program, wherein the computer readable program when executed on a computer causes the computer to: process items inserted into R using Bernoulli sampling; augment S with tracking counters during this processing; and process items deleted from R by using the tracking counters, such that the processing items deleted step includes removing newly deleted items from S using a calculated probability while maintaining a degree of uniformity in S.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there are described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

The present invention overcomes the problems associated with the prior art by teaching a system, computer program product, and method for maintaining Bernoulli samples over evolving multisets. Embodiments of the invention can handle arbitrary UDI transactions, avoid accessing the underlying databases, and avoid an undesirable coin-flipping step when the sample is accessed. Embodiments of the invention also utilize the auxiliary information that is used to maintain the sample in order to support accurate estimates of sums, frequencies, averages, and distinct-value counts. Embodiments of the method of the invention maintain an augmented Bernoulli sample S of a multiset R that comprises a triple including: "t", the distinct item; "X(t)", the frequency of the sample; and "Y(t)", a "tracking counter" that records that number of non-deleted insertions of t into R since the occurrence of the first of the X(t) net insertions of t into S. The tracking counters are used to obtain new unbiased, low variance estimators of: (1) item frequencies; (2) sums and averages over R of functions of item values; and (3) the number of distinct items in R, along with estimates of the variance and standard error of these estimators. The tracking counters are also used to obtain new asymptotically unbiased, low-variance estimators of ratios of sums over R of functions of item values.

As a result, the present invention is able to maintain Bernoulli samples over evolving multisets in the presence of arbitrary UDI operations without requiring access to the underlying datasets or a coin-flipping step.

Previous methods for maintaining Bernoulli samples over evolving datasets did not include the method of the present invention and required access to the underlying dataset, could not handle deletions, could not produce Bernoulli samples, could only sample from datasets that that are true sets and not multisets, or required a coin-flipping step whenever the sample was accessed.

Embodiments of the present invention may be used for many different purposes. For example, the present invention may be used in database applications including data integration, query optimization, network monitoring, and online analytical processing (OLAP).

The present invention provides a system and method for incrementally maintaining a Bernoulli sample over an evolving multiset (in which a given item may be duplicated one or more times). The algorithm can handle arbitrary UDI transactions and requires neither accesses of the underlying data nor a coin-flipping step when the sample is accessed. Bernoulli samples are truly uniform. Moreover, Bernoulli samples are easy to work with and are well-suited for parallel processing. Specifically, they can be maintained, independently and in parallel, for each partition of a distributed dataset, and the samples can be merged at any time to obtain a Bernoulli sample of the entire dataset. Bernoulli samples can also be easily subsampled, in order to reduce their space requirements.

In order to maintain a Bernoulli sample under UDI transactions, the present invention augments the sample with "tracking counters," for the purpose of handling deletions of items in a statistically correct manner. In accordance with embodiments of the invention, these tracking counters not only facilitate maintenance, but can also be used to obtain unbiased estimators of population frequencies, sums, and averages. Also, these estimators have lower variance than the usual estimators based on an ordinary (non-augmented) Bernoulli sample. Embodiments of the invention estimate the number of distinct items in the multiset in an unbiased manner. By "unbiased" it is meant that, on average, the estimators neither systematically underestimate nor overestimate the true value of the frequency, sum, average, or distinct-value count of interest. The present disclosure also provides formulas for assessing the precision of the estimators by estimating the variances and standard errors of the estimators.

Further, the present invention addresses issues that arise when incrementally maintaining samples that result from subsampling operations. Embodiments of the invention subsample one of the new augmented samples to obtain a new, smaller augmented sample that can be incrementally maintained.

To provide adequate background, the following discussion will describe classical Bernoulli sampling and maintenance schemes over ordinary sets. Throughout this disclosure, an update to a dataset will be considered to be a deletion followed by an insertion, and thus updates are not discussed separately.

Consider a (possibly infinite) set $T=\{t_1, t_2, \ldots\}$ of unique, distinguishable items that are inserted into and deleted from a dataset R over time. For example, T might correspond to a finite set of IP addresses or social security numbers, or the infinite set of nonnegative integers (perhaps representing order sizes). Denote by $\gamma=\{\gamma_1, \gamma_2, \ldots\}$ an infinite sequence of transactions, where each transaction $\gamma_i$ is either of the form $+t_k$, which corresponds to the insertion of item $t_k$ into R, or of the form $-t_k$, which corresponds to the deletion of item $t_k$ from R. In general, items that are deleted may be subsequently reinserted. Attention is restricted to "feasible" sequences such that $\gamma_i = -t_k$ only if item $t_k$ is in the dataset just prior to the processing of the ith transaction. In principle, when R is a multiset, m>1 copies of an item $t_k$ may be inserted into R or deleted from R in the course of a transaction; such a compound transaction is included within the framework of the current invention by viewing it as a sequence of m simple transactions, each involving a single insertion or deletion.

Denote by $R_i$ and $S_i$ the state of the dataset and sample, respectively, just after processing transaction $\gamma_i$. Without loss of generality, assume throughout that the initial state of the dataset and sample are given by $R_0 = S_0 = \emptyset$.

Bernoulli Sampling on Sets

In classical Bernoulli sampling, the transaction sequence $\gamma$ consists of insertions only, and there are no duplicates, so that an item in T is inserted at most once, and R is an ordinary set. For a specified sampling rate $q \in [0,1]$, each inserted item is included in the sample S with probability q and excluded with probability 1−q, independent of the other items. This scheme is referred to as BERN(q) sampling.

This sampling scheme is uniform in that it produces any two samples of the same size with equal probability. Other uniform sampling schemes are simple random sampling with and without replacement. Whereas the size of a simple random sample is fixed, the size of a Bernoulli sample is random, having a binomial distribution.

Bernoulli samples are easy to manipulate. Because items are included or excluded independently of each other, it follows immediately that, if $S_1$ and $S_2$ are BERN(q) samples of $R_1$ and $R_2$, respectively, and if $R_1 \cap R_2 = \emptyset$, then $S_1 \cup S_2$ is a BERN(q) sample of $R_1 \cup R_2$. Moreover, if S is a BERN(q) sample of R and S' is a BERN(q') sample of S, then S' is a BERN(q'q) sample of R.

It is straightforward to extend Bernoulli sampling on sets to handle deletions. For an insertion transaction $\gamma_i = +t_k$, simply set $S_i = S_{i-1} \cup \{t_k\}$ with probability q and $S_i = S_{i-1}$ with probability 1−q. For a deletion transaction $\gamma_i = -t_k$, set $S_i = S_{i-1} \setminus \{t_k\}$, i.e., remove item $t_k$ from the sample if it is present. Thus the deletion operation "annihilates" item $t_k$; it is as if item $t_k$ were never inserted into R. This scheme is called MBERN(q) sampling in the art. Observe that this procedure never accesses the underlying dataset R, so that sampling and sample maintenance trivially coincide.

One can now anticipate why maintaining a Bernoulli sample of a multiset is harder than maintaining a Bernoulli sample of an ordinary set. When processing a deletion transaction $\gamma_i = -t_k$, there may be multiple copies of item $t_k$, both in R and in S, so it is not immediately clear how to proceed.

Bernoulli Sampling on Multisets: Naïve Algorithm

Now suppose that an item $t \in T$ can appear more than once in the dataset, and hence in the sample. Then both the dataset and the sample are multisets. Denote by $X_t(t)$ the frequency of item $t \in T$ in the sample $S_i$ and by $N_i(t)$ the frequency of item t in the dataset $R_i$. Note that $N_i(t)$ is completely determined by the sequence $\gamma$, whereas $X_i(t)$ is a random variable. In this setting, $S_i$ is a BERN(q) sample of $R_i$ if and only if each $X_i(t)$ is binomially distributed with parameters $N_i(t)$ and q, and the random variables $\{X_i(t): t \in T\}$ are mutually independent.

The sample is assumed to be physically stored in a compressed representation. In this representation, each element of the sample comprises a pair $(t, X_i(t))$ when $X_i(t)>1$ or a singleton (t) when $X_i(t)=1$. An item t with $X_i(t)=0$ does not appear in the sample.

Note that, in any Bernoulli sample of a multiset, each item is maintained independently of the other items. That is, the value of $X_i(t)$ remains unaffected if an item $t' \neq t$ is inserted or removed. Without loss of generality, therefore, henceforth fix an item t and focus on the maintenance of $X_i(t)$ as the transaction sequence $\gamma$ is processed. It is therefore assumed that $\gamma$ consists solely of insertions and deletions of item t. For brevity, set $X_i = X_i(t)$ and $N_i = N_i(t)$. For $i=0$, the sample is empty and $X_i = 0$.

With these definitions in hand, a naive algorithm is now described for maintaining a Bernoulli sample of a multiset in the presence of UDI transactions. The algorithm computes $S_{i+1}$ from $S_i$ and $\gamma_{i+1}$ as follows. If $\gamma_{i+1} = +t$ (an insertion), then $$X_{i+1} = \begin{cases} X_i + 1 & \text{with probability } q \\ X_i & \text{with probability } 1-q \end{cases}$$

If $\gamma_{i+1} = -t$ (a deletion), then $$X_{i+1} = \begin{cases} X_i - 1 & \text{with probability } X_i/N_i \\ X_i & \text{with probability } 1 - (X_i/N_i) \end{cases}$$

Conceptually, the naive algorithm uses a "random pairing" approach, in which each deletion transaction is paired with (and hence annihilates) a previous insertion transaction, chosen randomly and uniformly from all such (currently non-annihilated) insertion transactions. If the deletion $\gamma_i$ is paired with a previous insertion $\gamma_{i-j}$ and if transaction $\gamma_{i-j}$ had originally resulted in a sample inclusion, then the annihilated item is removed from the sample, as well as from the dataset. The probability that a deletion transaction is paired with an insertion transaction that corresponds to an item in the sample is $X_i/N_i$.

Unfortunately, the naive algorithm is not very useful, because processing a deletion requires knowledge of the quantity $N_i$, which has to be obtained from the underlying dataset $R_i$. As discussed previously, $R_i$ is usually expensive, and sometimes impossible, to access. One might consider maintaining the counters $N_i$ locally for each distinct item in the dataset, but this is equivalent to storing the dataset itself, which is typically infeasible in practice.

A New Maintenance Method

As indicated in the previous section, in order to support Bernoulli sample maintenance in the presence of general UDI transactions to a multiset, one would like somehow to maintain only counters $N_i(t)$ corresponding to items t that are in the sample. Such maintenance is impossible, because insertions into the dataset of an item that is not currently in the sample, but will eventually be in the sample, cannot be properly accounted for. The new maintenance method rests on the fact that it suffices to maintain a "tracking counter" $Y_i(t)$ for each item t in the sample. Whenever $X_i(t)$, the frequency of t in the sample, is positive, the counter $Y_i(t)$ records the number of "net" (i.e., non-annihilated) insertions of t into the dataset since the first of the current $X_i(t)$ sample items was inserted; the dataset insertion corresponding to the first of these $X_i(t)$ sample inclusions is counted as part of $Y_i(t)$. In a preferred embodiment, the general layout of the sample $S_i$ is modified as follows: for each distinct item $t \in T$ that occurs in the sample at least once, $S_i$ contains the triple $(t, X_i(t), Y_i(t))$. To save space, the entry for t is stored as $(t, X_i(t), Y_i(t))$ if $Y_i(t)>1$ and simply as (t) if $X_i(T)=Y_i(t)=1$. The resulting space savings can be significant when there are many unique values in the dataset.

As in the above discussion, the focus is on the case of a single item t, and the state of $S_i$ is represented as $(X_i, Y_i)$; i.e., the notation suppresses the dependence on t. Take $X_i=Y_i=0$ whenever $t \notin S_i$. For i=0, the sample is empty and $X_i=Y_i=0$.

The new algorithm works as follows: If $\gamma_{i+1}=+t$, then $$(X_{i+1}, Y_{i+1}) = \begin{cases} (X_i + 1, Y_i + 1) & \text{if } \Phi_{i+1} = 1 \\ (X_i, Y_i + 1) & \text{if } \Phi_{i+1} = 0 \text{ and } X_i > 0 \\ (0, 0) & \text{otherwise} \end{cases}$$

where $\Phi_{i+1}$ is a 0/1 random variable such that $P(\Phi_{i+1}=1)=q$. If $\gamma_{i+1}=-t$, then $$(X_{i+1}, Y_{i+1}) = \begin{cases} (0, 0) & \text{if } X_i = 0 \text{ or } X_i = Y_i = 1 \\ (X_i - 1, Y_i - 1) & \text{if } X_i \geq 1 \text{ and } Y_i \geq 1 \text{ and } \Psi_{i+1} = 1 \\ (X_i, Y_i - 1) & \text{otherwise} \end{cases}$$

where $\Psi_{i+1}$ is a 0/1 random variable such that $$P(\Psi_{i+1} = 1) = \frac{X_i - 1}{Y_i - 1}.$$

Note that item t is removed from the sample if $X_i>0$ and $X_{i+1}=0$ and added to the sample if $X_i=0$ and $X_{i+1}>0$. It can be shown that $X_i$ is indeed a Bernoulli sample of $R_i$ for each i>0. The processing of $\gamma_{i+1}$ is based solely on $S_i$ and $\gamma_{i+1}$, that is, access to the dataset R is not required at any time.

An Example

Figure 1:
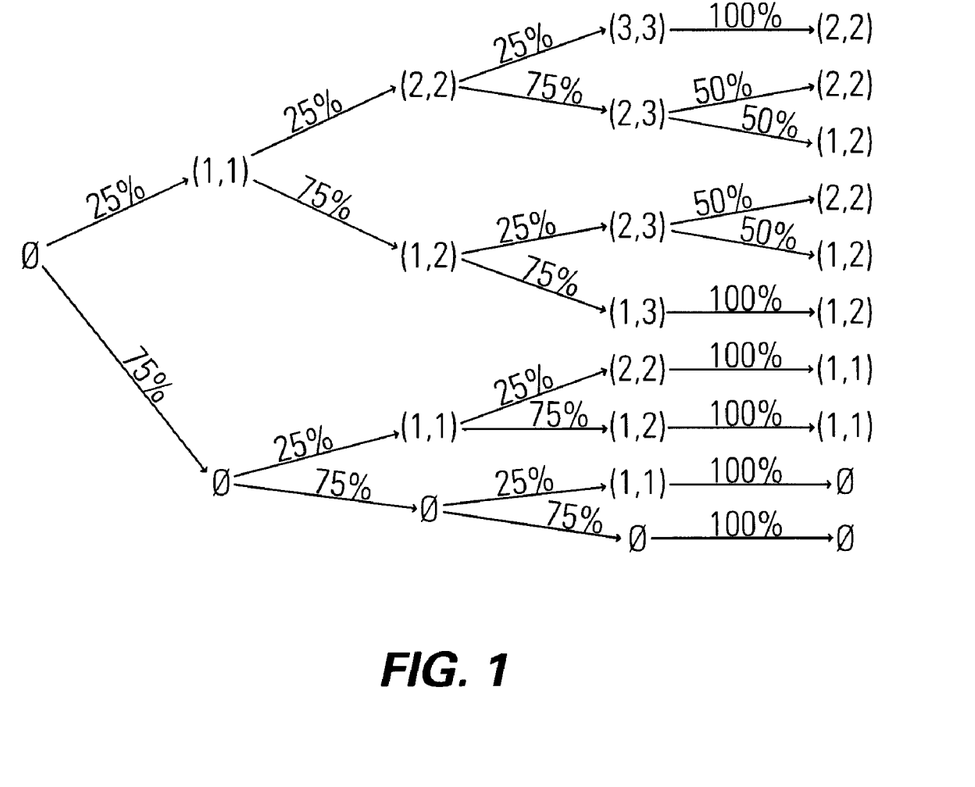
FIG. 1 shows a probability tree of the possible states of a Bernoulli sample generated using the system and method of one embodiment of the present invention.

FIG. 1 depicts a probability tree 10 for the algorithm with $\gamma=(+t,+t,+t,-t)$ and q=0.25. Each node of the tree represents a possible state of the sample; for example, (1,2) stands for $S=\{(t,1,2)\}$. Edges represent state transitions and are weighted by the respective transition probability. To determine the probability of reaching a given node, multiply the probabilities along the path from the root to the node. To compute the probability that the sample is in a specified state after $\gamma$ has been processed, sum the probabilities of all leaf nodes that correspond to the state. For example, $$P(S_4 = \emptyset) = \left(\frac{3}{4}\right)^2 \frac{1}{4} + \left(\frac{3}{4}\right)^3.$$

Summing up all such probabilities yields:

$$P(X_4 = 0) = \frac{9}{16} = (1-q)^2$$

$$P(X_4 = 1) = \frac{6}{16} = 2q(1-q)$$

$$P(X_4 = 2) = \frac{1}{16} = q^2.$$

Thus $X_4$ is binomially distributed, hence represents a Bernoulli sample of $R_4$.

Estimation

The tracking counters can be used to provide unbiased estimators for item frequencies in $R_i$ as well as for sums and averages over $R_i$ of functions of the items, and for the number of distinct items in $R_i$. These estimators have lower mean-squared error (MSE) than the usual estimators based on an ordinary Bernoulli sample. The tracking counters can also be used to provide asymptotically unbiased estimators of ratios of sums, as well as asymptotically unbiased estimators of the variance and standard error of the frequency, sum, average, ratio, and distinct-count estimators mentioned above. In the following, the time index i is fixed, and is suppressed in the notation.

Estimating Frequencies

Again assume a single item t, ignoring the tracking counters in the augmented Bernoulli sample, the standard unbiased Horvitz-Thompson (HT) of the frequency N of t in R, based on an ordinary Bernoulli sample, is $\hat{N}_X=X/q$. In one embodiment, the invention estimates N as $$\hat{N}_Y = \begin{cases} 0 & \text{if } Y = 0 \\ Y - 1 + (1/q) & \text{otherwise} \end{cases}.$$

The estimator $\hat{N}_Y$ is unbiased for N and has lower variance (and hence MSE) than the standard estimator $\hat{N}_X$. The variance of $\hat{N}_Y$ can be estimated as $$\hat{V}[\hat{N}_Y] = \frac{1 - q - (1-q)^{\hat{N}_Y + 1}}{q^2}.$$

This estimator is slightly biased, but the bias decreases to 0 as the sampling rate q increases to 1. That is, the estimator is "asymptotically unbiased." As is well known to those skilled in the art, an asymptotically unbiased estimate of the standard error of an estimator such as $\hat{N}_Y$ is obtained from an estimator of the variance of $\hat{N}_Y$ by simply taking a square root.

Estimating Sums, Averages, and Ratios

The foregoing results for frequencies lead immediately to improved, unbiased estimators for sums and averages, as well as estimators for ratios. Consider a real-valued function g defined on T. In one embodiment, the invention estimates the sum of g(t) over all items t in the dataset, that is, $\alpha(g)=\Sigma_{t \in T} g(t)N(t)$, by $$\hat{\alpha}_Y(g) = \sum_{t \in D(S)} g(t)\hat{N}_Y(t),$$

where D(S) is the set of distinct items that appear in S, and $\hat{N}_Y(t)$ is the improved frequency estimator for item t, as described in the preceding section. The variance of this estimator may be estimated as $$\hat{V}[\hat{\alpha}_Y(g)] = \sum_{t \in D(S)} g^2(t) \frac{1 - q - (1-q)^{\hat{N}_Y(t)+1}}{q^2(1 - (1-q)^{\hat{N}_Y(t)})}.$$

The bias of this estimator decreases to 0 as q increases to 1.

The above method extends in a straightforward way to averages of the form $\mu(g)=(1/|R|)\Sigma_{t \in T}g(t)N(t)$, where $|R|$ is the total number of items in the dataset. Because $|R|$ is usually known in applications, one embodiment of the invention treats $|R|$ as a deterministic constant, adding a multiplicative factor of $1/|R|$ to the estimator and a factor of $1/|R|^2$ to the variance estimator.

A less trivial scenario arises when estimating a ratio of the form $$\rho = \frac{\sum_{t \in T} g(t)N(t)}{\sum_{t \in T} h(t)N(t)} = \frac{\alpha(g)}{\alpha(h)}$$

where g and h are arbitrary real-valued functions defined on T. In one embodiment of the invention, the estimator of $\rho$ is given by $$\hat{\rho} = \frac{\sum_{t \in D(S)} g(t)\hat{N}_Y(t)}{\sum_{t \in D(S)} h(t)\hat{N}_Y(t)}$$

and the variance of this estimator estimated by $$\hat{V}[\hat{\rho}] = \frac{1}{\hat{\alpha}_Y^2(h)}(\hat{V}[\hat{\alpha}_Y(g)] + \hat{\rho}^2 \hat{V}[\hat{\alpha}_Y(h)] - 2\hat{\rho}\hat{C}[\hat{\alpha}_Y(g), \hat{\alpha}_Y(h)]),$$

where $$\hat{C}[\hat{\alpha}_Y(g), \hat{\alpha}_Y(h)] = \sum_{t \in D(S)} g(t)h(t) \frac{1-q-(1-q)^{\hat{N}_Y(t)+1}}{q^2(1-(1-q)^{\hat{N}_Y(t)})}.$$

There are many variations on the above ratio estimator and its associated variance estimator that are well known to those skilled in the art.

Estimating Distinct-Item Counts

In one embodiment of the invention, the tracking counters for the sample S are used to obtain unbiased estimators of the number of distinct items in the dataset R. One unbiased estimator is $\hat{D}_{HT}=|S'|/q$, where the (ordinary) set $S' \subset T$ is obtained from the sample S (which is a multiset) by examining each $t \in D(S)$ and including t in S' with probability p(t), where p(t)=1 if Y(t)=1 and p(t)=q if Y(t)>1, An asymptotically unbiased estimate of the variance of $\hat{D}_{HT}$ is $\hat{V}[\hat{D}_{HT}]=(1-q)\hat{D}_{HT}/q$. An improved unbiased estimator is given by $\hat{D}_Y=\Sigma_{t \in D(S)}p(t)/q$. An asymptotically unbiased estimate of the variance of $\hat{D}_Y$ is $$\hat{V}[\hat{D}_Y] = \sum_{t \in D(S)} \frac{(1-q)^{\hat{N}_Y(t)}}{q(1-(1-q)^{\hat{N}_Y(t)})}$$

This latter estimator is "improved" in the sense that the variance (and hence MSE) of $\hat{D}_Y$ is smaller than that of $\hat{D}_{HT}$.

Subsampling

The subsampling problem can be described as follows: given an augmented Bernoulli sample S of a dataset R drawn with sampling rate q, produce an augmented Bernoulli S' from R with sampling rate q'<q without accessing R. That is, both the augmented Bernoulli sample and subsample are created and maintained using the stream of UDI transactions that are operating on the underlying dataset R, without actually accessing R. As discussed above, accesses to the underlying dataset R are much more computationally expensive than accesses to the UDI data stream. Subsampling has applications in practice whenever the sampling process is run on a system with bounded processing or space capabilities. In more detail, when the current sample has become too large to be easily accommodated, one may execute a subsampling operation in order to (with high probability) reduce the size of the sample. (Subsampling must be applied with care, however, so as not to compromise the uniformity of the sample.)

As indicated above, the subsampling problem is trivial if the only goal is to produce an ordinary Bernoulli subsample that does not need to be incrementally maintained. The challenge in the general setting is to assign appropriate values to the tracking counters of the subsample, so that incremental maintenance can be continued.

A subsampling method is now presented according to an embodiment of the invention. Let $S_i$ be the sample after processing transactions $\gamma_1, \gamma_2, \ldots, \gamma_i$ with sampling rate q. Again, suppress the subscript i and fix an item t, so that $S_i$ is given by $S=(X,Y)$. Given S, the goal is to generate $S'=(X',Y')$ having the correct probability distribution.

The algorithm used in the method is as follows: Set $q^*=q'/q$. Let $\Phi$ be a 0/1 random variable with $P(\Phi=1)=q^*$ and $P(\Phi=0)=1-q^*$. Let $\Psi$ be a binomially distributed random variable such that $$P(\Psi = k) = \binom{X-1}{k}(q^*)^k(1-q^*)^{X-1-k}$$

for $0 \leq k \leq X-1$. Observe that $\Psi=0$ when $X=1$. The random variable $\Phi$ has the interpretation that $\Phi=1$ if and only if the first of the X items that were included into S is retained in S'; the random variable $\Psi$ is the number of the remaining X-1 items that are retained. The algorithm sets $$X' = \begin{cases} 0 & \text{if } X = 0 \\ \Phi + \Psi & \text{otherwise.} \end{cases}$$

To compute Y', let $\Upsilon$ be another random variable with $$P(\Upsilon = m) = \frac{X'}{m}\prod_{i=m+1}^{Y-1}\left(1 - \frac{X'}{i}\right)$$

for $X' \leq m \leq Y-1$. (By convention, take an empty product as equal to 1.) The algorithm sets $$Y' = \begin{cases} 0 & \text{if } X' = 0 \\ Y & \text{if } X' > 0 \text{ and } \Phi = 1 \\ \Upsilon & \text{otherwise} \end{cases}$$

Merging

The merging problem is defined as follows. Given partitions $R_1$ and $R_2$ of R with $R_1 \cup R_2 = R$, along with two corresponding augmented Bernoulli samples $S_1$ and $S_2$, mutually independent and each with sampling rate q, derive an augmented Bernoulli sample S from R with sampling rate q by accessing $S_1$ and $S_2$ only. Note that here ∪ has multiset semantics, so that it need not be the case that $R_1$ and $R_2$ are disjoint, that is, $R_1 \cap R_2 = \emptyset$; in multiset semantics, if $N_1(t)$, $N_2(t)$, $N_\cup(t)$, and $N_\cap(t)$ denote the frequency of item t in $R_1$, $R_2$, $R_1 \cup R_2$, and $R_1 \cap R_2$, respectively, then $N_\cup(t) = N_1(t) + N_2(t)$ and $N_\cap(t) = \min(N_1(t), N_2(t))$. Merging is used in practice when R is distributed across several nodes. One may then compute a sample of each partition locally and derive a sample of the complete dataset by merging these local samples. This approach is often superior, in terms of parallelism and communication cost, to first reconstructing R and sampling afterwards. The merging operation can be used more generally to obtain a sample of any specified union of the partitions.

If S is not subject to further maintenance, simply set $X(t) = X_1(t) + X_2(t)$ for all $t \in S_1 \cup S_2$, thereby producing a non-augmented Bernoulli sample. Here $X_1(t)$ and $X_2(t)$ denote the frequency of item t in the respective subsamples, and $X(t)$ denotes the frequency of item t in the merged sample. A harder version of the problem is to derive a merged sample S that includes a tracking counter, so that maintenance of S can be continued. If $R_1$ and $R_2$ are disjoint, that is, $R_1 \cap R_2 = \emptyset$, then setting $S = S_1 \cup S_2$ yields the desired augmented Bernoulli sample. It can be shown that otherwise, the hard merging problem cannot be solved.

Note that, if the respective sampling rates $q_1$ and $q_2$ for $S_1$ and $S_2$ are not the same, the sampling rates can be equalized by subsampling prior to merging. E.g., if $q_1 > q_2$, then first subsample $S_1$ at rate $q^* = q_2/q_1$, as described previously, thereby obtaining a new augmented Bernoulli sample $S'_1$ having rate $q_2$; finally, merge $S'_1$ and $S_2$.

Implementation

Figure 2:
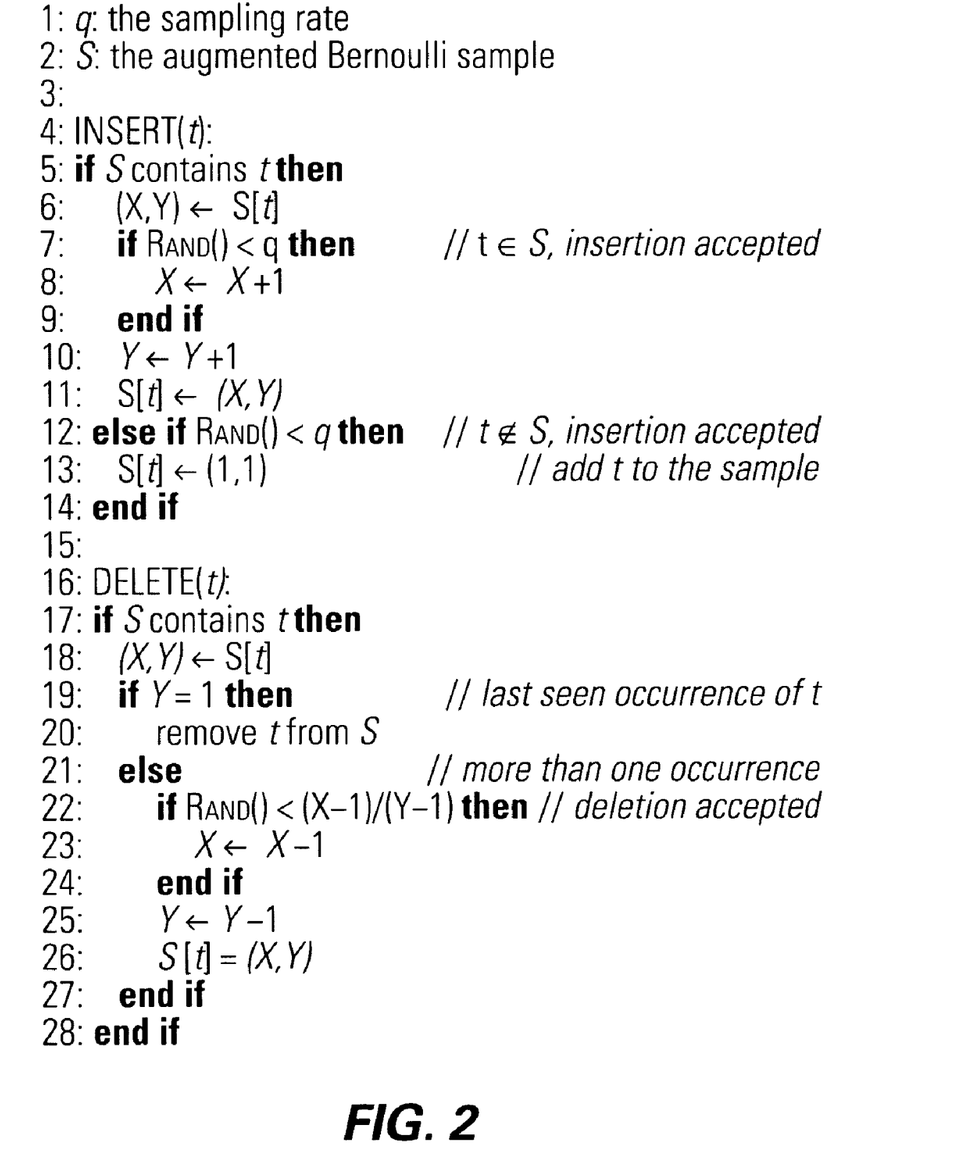
FIG. 2 shows a pseudocode computer program of a sampling method with deletions in accordance with one embodiment of the present invention.

FIG. 2 shows an exemplary pseudocode program for the sample maintenance method in accordance with an embodiment of the invention. In FIG. 2, the function RAND generates a pseudorandom number in the interval [0,1). One may significantly reduce the number of calls to RAND in line 7 and 12. The idea is to maintain a counter L for the number of items which are skipped before the next sample insertion (line 8 and 13). If L>0, then the item is rejected and L is decremented. Otherwise, L=0, the item is accepted, and L is regenerated. It can be shown that L is geometrically distributed, and efficient algorithms for generating such a geometric random variable may be found in L. Devroye, "Non-Uniform Random Variate Generation" Springer, New York, 1986, p. 498, which is incorporated by reference.

Figure 3:
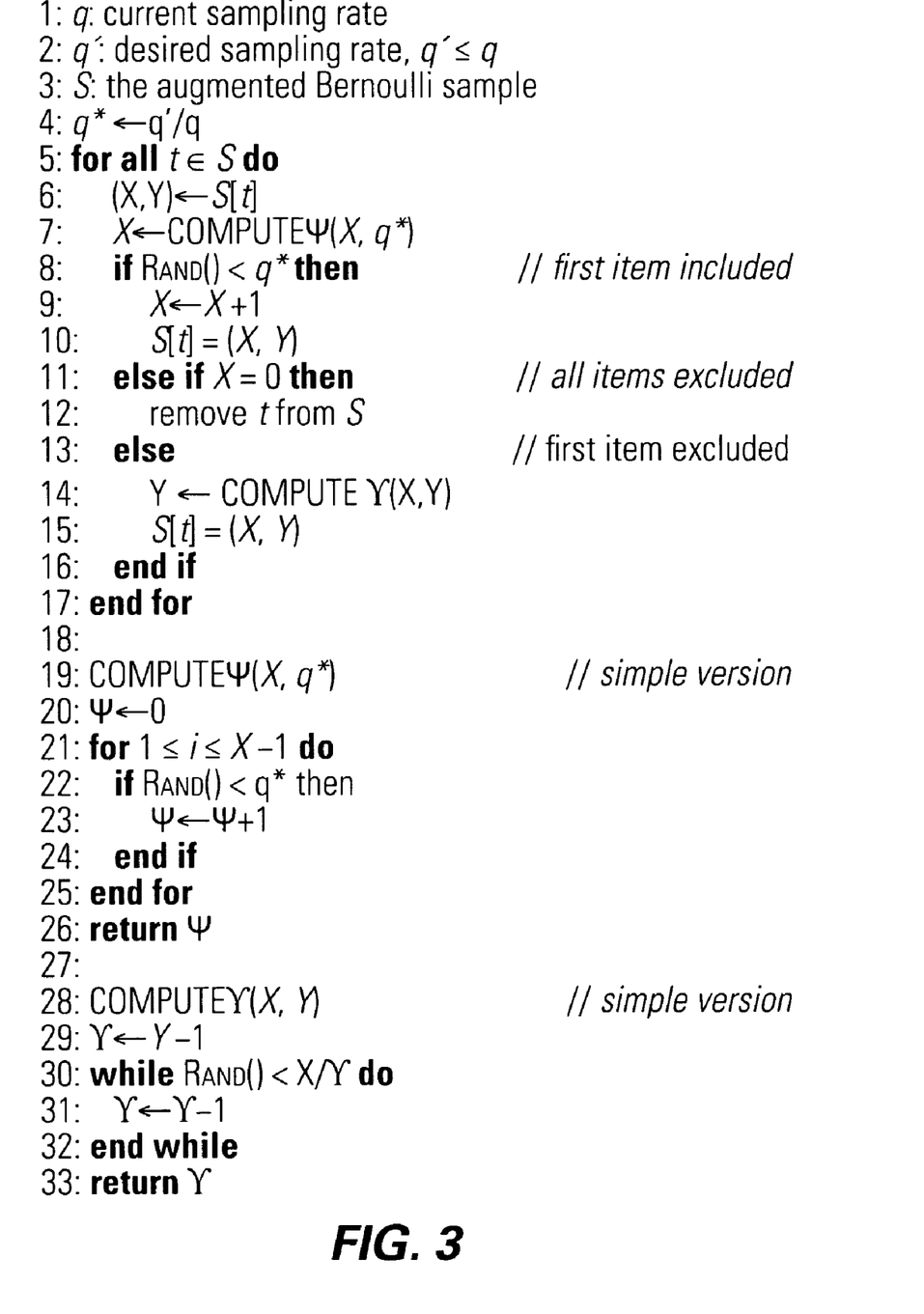
FIG. 3 shows a pseudocode computer program of a subsampling method in accordance with one embodiment of the present invention.

FIG. 3 shows an exemplary pseudocode program for the subsampling method in accordance with an embodiment of the invention. For simplicity, the figure displays simple versions of the functions COMPUTEΨ and COMPUTEϒ, which generate samples of the random variables Ψ and ϒ, respectively. More efficient generation algorithms may be found in L. Devroye, "Non-Uniform Random Variate Generation" Springer, New York, 1986, pp. 521 and 619, which is incorporated by reference.

Figure 4A:
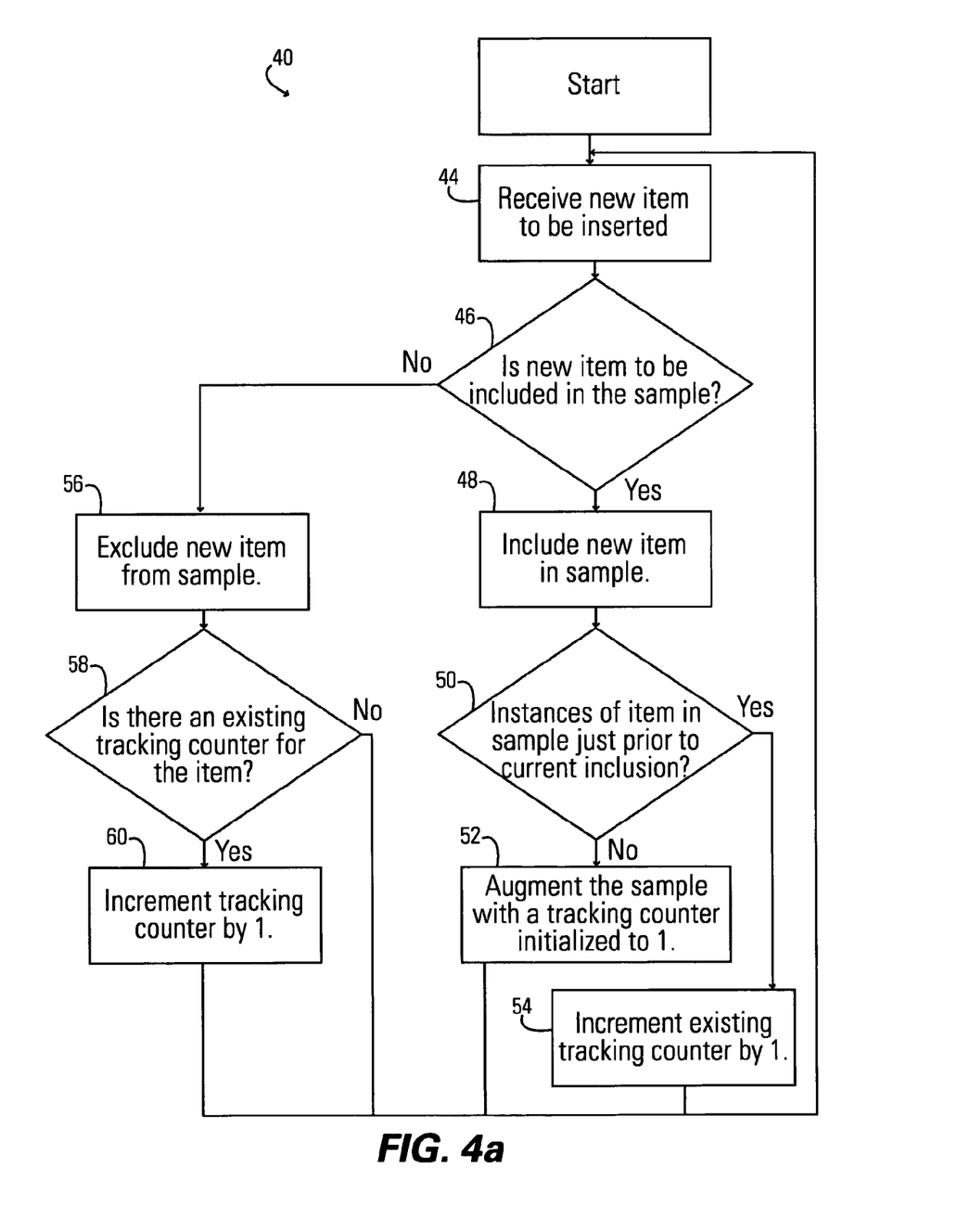
FIG. 4a shows a flow chart of a method of maintaining a Bernoulli sample when a new item is inserted in accordance with an embodiment of the present invention.
Figure 4B:
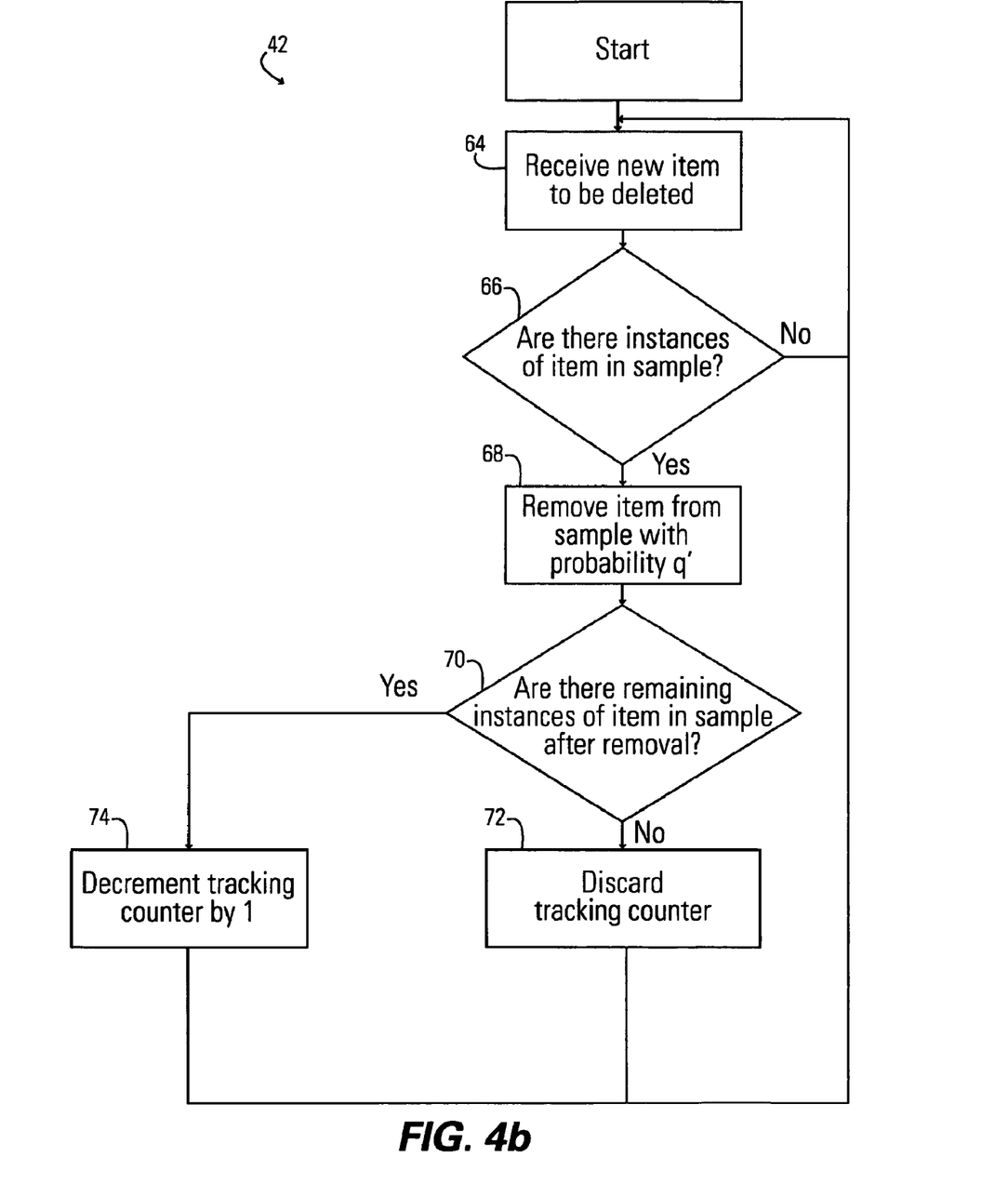
FIG. 4b shows a flow chart of a method of maintaining a Bernoulli sample when a new item is deleted in accordance with an embodiment of the present invention.

FIGS. 4a and 4b show flow charts of a method of maintaining a Bernoulli sample in accordance with an embodiment of the present invention. In particular, FIG. 4a shows a method 40 of incrementally maintaining a Bernoulli sample when a new item to be inserted into a data set is received. FIG. 4b shows a method 42 of incrementally maintaining a Bernoulli sample when a new item to be deleted into a data set is received. The method 40 in FIG. 4a begins with step 44 when the new item to be inserted is received. In step 46 it is determined whether the new item is to be included in the Bernoulli sample. This determination is made using a predetermined fixed probability q that the new item will be inserted and a fixed predetermined probability 1−q that the item will be excluded.

If the new item is to be included in the Bernoulli sample, then step 48 will add the new item to the sample. Step 50 will then determine if there are any instances of the item in the sample just prior to the current inclusion. If not, the process will augment the sample with a tracking counter for the item and will initialize the tracking counter with a value of 1, in step 52 and the process will return to step 44 where the next item to be inserted is received.

If step 50 determined that there were instances of the item in the sample just prior to the current inclusion, then there should already be a tracking counter and step 54 will increment this existing tracking counter by 1. The process then returns to the beginning at step 44 where the next item to be inserted is received.

Note that step 46 may determine that the new item was not to be included in the sample. This will occur with a predetermined fixed probability of 1−q, in which case step 56 will exclude the new item from the sample. Step 58 will then determine if there is an existing tracking counter for the item (i.e., a tracking counter created during the inclusion of a previous instance of the item into the sample), and if so, step 60 will increment the tracking counter by 1 and the process will return to step 44. If there was not an existing tracking counter, as determined by step 58, then the process will return to step 44.

FIG. 4b shows a method 42 of incrementally maintaining a Bernoulli sample when a new item to be deleted from a data set is received. The method 42 begins with step 64 when the new item to be deleted is received. Step 66 determines if there are instances of the item to be deleted in the sample. If not, the process returns to step 64. If there are instances of the item in the sample, then step 68 will remove the item from the sample with a calculated probability q'. This calculated probability q' may depend upon both the number of instances of the item in the sample and the value of the tracking counter for the item.

Step 70 will then determine if there are any remaining instances of the item in the sample after removal. If not, the tracking counter is discarded in step 72 and the process returns to step 64. If there are remaining instances of the item then step 74 will decrement the tracking counter by 1 and the process will return to step 64. As explained above, the tracking counters may be used to obtain estimators of: item frequencies; sums and averages over R of functions of item values; and the number of distinct items in R. The tracking counters may then be used to obtain estimates of the variance and standard error of the estimators.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Current examples of optical disks include compact disk-read-only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 5:
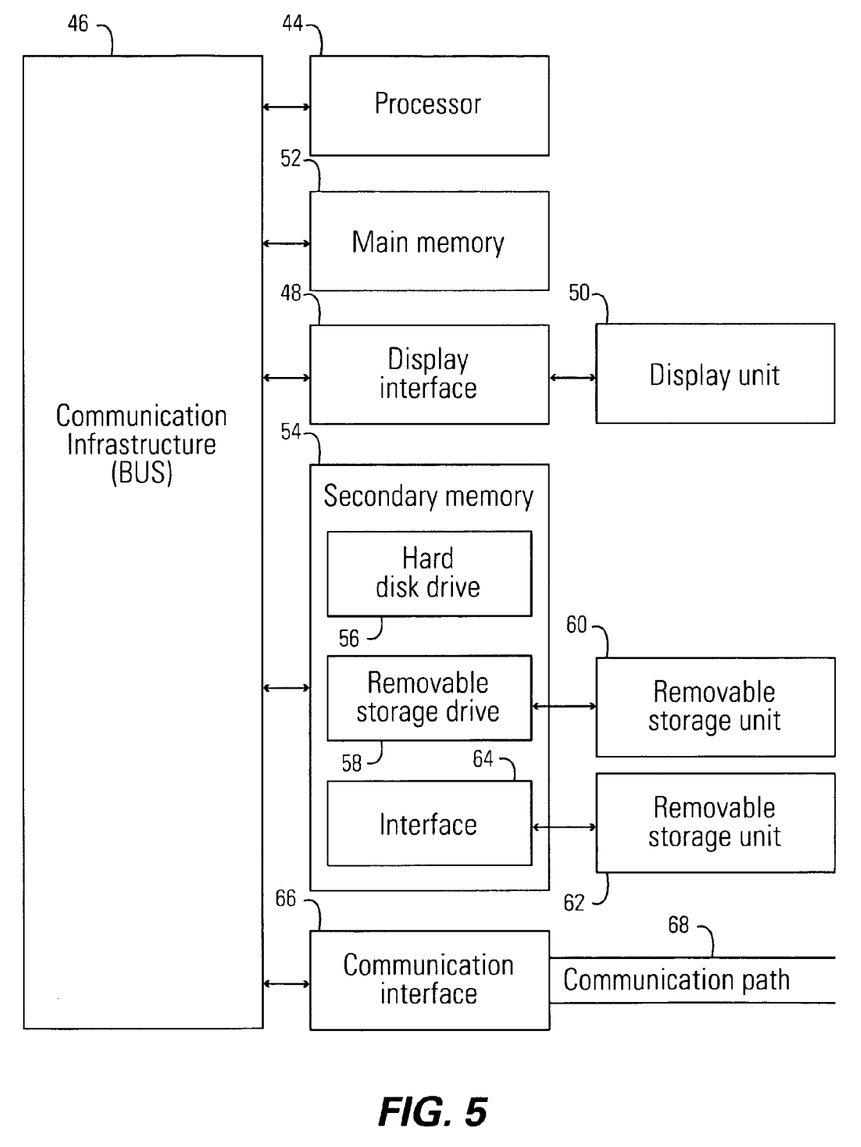
FIG. 5 shows a high level block diagram of an information processing system useful for implementing one embodiment of the present invention.

FIG. 5 is a high level block diagram showing an information processing system useful for implementing one embodiment of the present invention. The computer system includes one or more processors, such as processor 44. The processor 44 is connected to a communication infrastructure 46 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 48 that forwards graphics, text, and other data from the communication infrastructure 46 (or from a frame buffer not shown) for display on a display unit 50. The computer system also includes a main memory 52, preferably random access memory (RAM), and may also include a secondary memory 54. The secondary memory 54 may include, for example, a hard disk drive 56 and/or a removable storage drive 58, representing, for example, a floppy disk drive, a magnetic tape drive, or an optical disk drive. The removable storage drive 58 reads from and/or writes to a removable storage unit 60 in a manner well known to those having ordinary skill in the art. Removable storage unit 60 represents, for example, a floppy disk, a compact disc, a magnetic tape, or an optical disk, etc. which is read by and written to by removable storage drive 58. As will be appreciated, the removable storage unit 60 includes a computer readable medium having stored therein computer software and/or data.

In alternative embodiments, the secondary memory 54 may include other similar means for allowing computer programs or other instructions to be loaded into the computer system. Such means may include, for example, a removable storage unit 62 and an interface 64. Examples of such means may include a program cartridge and cartridge interface (such as that found in video game devices), a removable memory chip (such as an EPROM, or PROM) and associated socket, and other removable storage units 62 and interfaces 64 which allow software and data to be transferred from the removable storage unit 62 to the computer system.

The computer system may also include a communications interface 66. Communications interface 66 allows software and data to be transferred between the computer system and external devices. Examples of communications interface 66 may include a modem, a network interface (such as an Ethernet card), a communications port, or a PCMCIA slot and card, etc. Software and data transferred via communications interface 66 are in the form of signals which may be, for example, electronic, electromagnetic, optical, or other signals capable of being received by communications interface 66. These signals are provided to communications interface 66 via a communications path (i.e., channel) 68. This channel 68 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 52 and secondary memory 54, removable storage drive 58, and a hard disk installed in hard disk drive 56.

Computer programs (also called computer control logic) are stored in main memory 52 and/or secondary memory 54. Computer programs may also be received via communications interface 66. Such computer programs, when executed, enable the computer system to perform the features of the present invention as discussed herein. In particular, the computer programs, when executed, enable the processor 44 to perform the features of the computer system. Accordingly, such computer programs represent controllers of the computer system.

From the above description, it can be seen that the present invention provides a system, computer program product, and method for maintaining a Bernoulli sample of an evolving multiset. The present invention can handle arbitrary UDI transactions, avoids ever accessing the underlying dataset, and avoids undesirable coin-flipping procedures. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method for incrementally maintaining a Bernoulli sample S with sampling rate q over a multiset R in the presence of update, delete, and insert transactions, said method comprising:
   processing items inserted into R using Bernoulli sampling;
   augmenting S with tracking counters during said processing based upon the frequency of occurrence of each of the items in S; and
   processing items deleted from R by using said tracking counters, said processing items deleted including removing newly deleted items from S according to a calculated probability while maintaining a degree of uniformity in S.

2. The method of claim 1, wherein said processing items inserted into R comprises:
including said item in S with a fixed probability q and excluding said item with probability 1−q; and
augmenting S with a tracking counter for said item and initializing the value of said tracking counter to 1 if said item is included and there are no instances of said item in said Bernoulli sample just prior to said including.

3. The method of claim 2, further comprising incrementing said tracking counter for said item by 1 if there is at least one instance of said item in said Bernoulli sample just prior to said processing.

4. The method of claim 1, wherein said processing an item deleted from R comprises:
removing, according to a calculated probability, said newly deleted item from S if there is at least one instance of said newly deleted item in S; and
decrementing said tracking counter by 1 if there is at least one instance of said item in S after said removing.

5. The method of claim 4 further comprising discarding said tracking counter for said newly deleted item if there are no remaining instances of said newly deleted item in S after said removing.

6. The method of claim 4 wherein said calculated probability depends upon both the number of instances of said newly deleted item in S and the value of said tracking counter for said newly deleted item.

7. The method of claim 6 wherein said calculated probability is calculated such that said calculated probability equals 1 if $X(t)=Y(t)=1$, and otherwise equals $(X(t)-1)/(Y(t)-1)$, where $X(t)$ is the number of instances of t in the sample, and $Y(t)$ is the tracking counter value, just prior to processing.

8. The method of claim 1 further comprising:
obtaining a new Bernoulli sample S' from S wherein S' is smaller than S, corresponding to a sampling rate $q'<q$, and S' is augmented with tracking counters that permit further incremental maintenance.

9. The method of claim 1 wherein said processing items inserted, said augmenting, and said processing items deleted are performed without accessing said multiset R.

10. The method of claim 1 further comprising producing and maintaining triples of the form $(t, X(t), Y(t))$, where t is a distinct item, $X(t)$ is the frequency of t in S, and $Y(t)$ is said tracking counter that records the number of non-deleted insertions of t into R since the occurrence of the first of the $X(t)$ net insertions of t into S.

11. A method for sampling a multiset R comprising:
generating a Bernoulli sample S of said multiset R;
creating tracking counters for keeping track of the frequency of occurrence of items in S; and
using said tracking counters to obtain estimators of at least one of: the frequency of an item in R; the number of distinct items in R; aggregates of numerical functions defined on the items in R; and functions of said aggregates.

12. The method of claim 11 wherein said generating, creating and using are performed without accessing said multiset R.

13. The method of claim 11 further comprising:
obtaining a new Bernoulli sample S' from S wherein S' is smaller than S, corresponding to a sampling rate $q'<q$, and S' is augmented with tracking counters that permit further incremental maintenance.

14. The method of claim 11 further comprising producing and maintaining triples of the form $(t, X(t), Y(t))$, where t is a distinct item, $X(t)$ is the frequency of t in S, and $Y(t)$ is said tracking counter that records the number of non-deleted insertions of t into R since the occurrence of the first of the $X(t)$ net insertions of t into S.

15. The method of claim 11 further comprising merging augmented Bernoulli samples $S_1$ and $S_2$ from respective disjoint datasets $R_1$ and $R_2$ to obtain an augmented Bernoulli sample of $R_1$ or $R_2$.

16. A system for incrementally maintaining a Bernoulli sample S with sampling rate q over a multiset R in the presence of update, delete, and insert transactions, said system comprising:
means for processing, via a processor, items inserted into R using Bernoulli sampling;
means for augmenting S with tracking counters during said processing based upon the frequency of occurrence of each of the items in S; and
means for processing items deleted from R by using said tracking counters, said means for processing items deleted including means for removing newly deleted items from S according to a calculated probability while maintaining a degree of uniformity in S.

17. A computer program product comprising a computer readable storage medium having a computer readable program, wherein said computer readable program when executed on a computer causes said computer to:
process items inserted into R using Bernoulli sampling;
augment S with tracking counters during said processing based upon the frequency of occurrence of each of the items in S; and
process items deleted from R by using said tracking counters, said processing including removing newly deleted items from S using a calculated probability while maintaining a degree of uniformity in S.

18. The computer program product of claim 17 wherein said computer readable program further causes said computer to augment S by producing and maintaining triples of the form $(t, X(t), Y(t))$, where t is a distinct item, $X(t)$ is the frequency of t in said sample S, and $Y(t)$ is a tracking counter that records the number of non-deleted insertions of t into R since the first of the $X(t)$ net insertions of t into said sample S.

19. The computer program product of claim 17 wherein said computer readable program further causes said computer to:
obtain a new Bernoulli sample S' from S wherein S' is smaller than S, corresponding to a sampling rate $q'<q$, and S' is augmented with tracking counters that permit further incremental maintenance.

20. The computer program product of claim 17 wherein said computer readable program further causes said computer to: use said tracking counters to obtain estimators of at least one of: the frequency of an item in R; the number of distinct items in R; aggregates of numerical functions defined on the items in R; and functions of said aggregates.

* * * * *